United States Patent [19]

Grund

[11] Patent Number: 5,612,104

[45] Date of Patent: Mar. 18, 1997

[54] FIVE-LAYER, BIAXIALLY STRETCHED TUBULAR FILM FOR PACKAGING AND ENCASING PASTY FOOD STUFFS

[75] Inventor: Hartmut Grund, Otterstadt, Germany

[73] Assignee: Naturin GmbH, Weinheim, Germany

[21] Appl. No.: 492,012

[22] PCT Filed: Nov. 9, 1994

[86] PCT No.: PCT/EP94/03676

§ 371 Date: Jul. 19, 1995

§ 102(e) Date: Jul. 19, 1995

[87] PCT Pub. No.: WO95/13707

PCT Pub. Date: May 26, 1995

[30] Foreign Application Priority Data

Nov. 19, 1993 [DE] Germany .................. 43 39 337.3

[51] Int. Cl.$^6$ .................. A22C 13/00; F16L 11/08
[52] U.S. Cl. .................. 428/348; 206/802; 138/118.1; 426/105; 426/278; 426/129; 426/135
[58] Field of Search .................. 428/34.8; 206/802; 138/118.1; 426/105, 278, 129, 135

[56] References Cited

U.S. PATENT DOCUMENTS

| | | | |
|---|---|---|---|
| 3,788,503 | 1/1974 | Hirose et al. | 264/95 |
| 4,560,520 | 12/1985 | Erk et al. | 264/22 |
| 4,601,929 | 7/1986 | Erk et al. | 428/36 |
| 4,606,922 | 8/1986 | Schirmer | 426/412 |
| 4,944,970 | 7/1990 | Stenger et al. | 428/34.8 |
| 5,185,189 | 2/1993 | Stenger et al. | 428/34.8 |
| 5,219,002 | 6/1993 | Stenger et al. | 130/118.1 |

OTHER PUBLICATIONS

Abstract of Published German Patent Application No. DE 2,850, 181.
Abstract of Published German Patent Application No. DE 4,001, 612.
Abstract of Published German Patent Application No. DE 4, 128,081.
Abstract of Published German Patent Application No. DE 4,130,486.
Abstract of Published European Patent Application No. EP 216,094.
Abstract of Published European Patent Application No. EP 530,538.
Abstract of Published European Patent Application No. EP 530,549.
Abstract of Published European Patent Application No. EP 603,676.

*Primary Examiner*—Charles Nold
*Attorney, Agent, or Firm*—Evenson, McKeown, Edwards & Lenahan P.L.L.C.

[57] ABSTRACT

A five-layer, tubular polyamide film for wrapping and/or covering pasty foodstuffs, in particular for use as a sausage casing, in which the film is made up of an inner layer and an outer layer made of the same polyamide material consisting of at least one at least one aliphatic polyamide and/or at least one aliphatic copolyamide and/or at least one partly aromatic polyamide and/or at least one partly aromatic copolyamide, a middle polyolefin layer, and two bonding agent layers each made of the same material. The proportion of partly aromatic polyamide and/or copolyamide is 5 to 60%, in particular 10 to 50%, relative to the total weight of the polymer mixture of partly aromatic and aliphatic polyamides and copolyamides.

23 Claims, No Drawings

FIVE-LAYER, BIAXIALLY STRETCHED TUBULAR FILM FOR PACKAGING AND ENCASING PASTY FOOD STUFFS

BACKGROUND AND SUMMARY OF THE INVENTION

The present invention relates to a five-layer, biaxially stretched tubular film having a high water vapor and oxygen barrier and used to package food stuffs which have a paste-like or molten consistency when being filled and which are optionally subjected to heat processing up to the sterilization temperature after filling; these particularly include food stuffs such as boiled and cooked sausages as well as soft cheese.

Casings used for such food stuffs have to meet various requirements in order to be suitable in practice. The most important requirements are:

1. Even after cooling of the filling which has been heated before, the casing must lie around the packaged content in a wrinkle-free manner, irrespective of the volume reduction during cooling, in order to impart a sales-promoting appearance to the product.

2. The casing must not deform permanently during the filling procedure and under the pressure exerted by the expanding content during heating. The casing must maintain its exact cylindrical shape and must not bend or bulge.

3. The casing must have sufficient strength to withstand the compression load exerted by the filling during cooking or sterilization without bursting or rupturing.

4. The casing may have an only low moisture vapor transmission so as to avoid excessive weight loss during storage without cooling, occurrence of wrinkles on the product, as well as a color change of the filling surface owing to drying up.

5. The casing must have a high oxygen barrier to prevent early greying of the filling surface even during storage without cooling.

6. The casing shall adhere to the meat filling to prevent deposition of jelly between the casing and the filling.

7. The casing must allow shirring and clipping without undergoing damages.

8. The casing must be easy to print and shall provide good adhesion of the printing ink during boiling and sterilization.

9. The casing should be ecologically acceptable, in particular it should not contain chlorine compounds and heavy metals impairing thermal decomposition.

10. The casing shall be offered at a reasonable price.

Until today, there are no biaxially stretched tubular films meeting all of these requirements.

Biaxially stretched tubular films made of polyvinylidene chloride copolymers (PVDC) meet the demand for good water vapor and oxygen barriers. However, wrinkle-free sausages can be obtained with these casings only when they are subjected to an additional heat treatment after cooling. This treatment is known to those skilled in the art as "post-shrinkage". "Post-shrinkage" means that the cooled sausage having a temperature of about 3° C. is heated for several seconds to a temperature of more than 80° C. by means of hot water or hot air. During this procedure the casing shrinks and sets down in a closer and wrinkle-free manner on the meat filling whose volume has reduced through said cooling. Normally, this additional post-shrinkage is not included in the known process of manufacturing cooked and boiled sausages. For this reason, this subsequent process step requiring additional equipment and energy is not, or only unwillingly, accepted by the skilled artisan. Also, from the ecological point of view, chlorine-containing packing means are being increasingly repressed and replaced by alternative packaging solutions.

Also, in case of biaxially stretched tubular films made of polyethylene terephthalate post-shrinkage is necessary to obtain wrinkle-free sausages. In addition, these sausage casings have an unfavorable deposition behavior, i.e., a considerable amount of jelly collects between the sausage casing and the sausage meat after boiling.

Single-layer, biaxially stretched tubular films based on aliphatic polyamides are known from the patent literature.

DE 32 27 945 describes a single-layer, elastic tubular film of polyamide which may crystallize in the α-form. The special elastic properties are achieved by completely thermosetting the tubular film after multiaxial stretching under multiaxial, controlled shrinkage. This casing meets many requirements, however, those with respect to a strong barrier to oxygen and particularly to water vapor are not met.

DE 28 50 181 describes a straight or curved tubular film made of a plastics mixture consisting of at least one aliphatic polyamide and an ionomer resin and/or a modified ethylene-vinyl acetate-copolymer. By adding polymers having a lower moisture vapor transmission than aliphatic polyamides, the moisture vapor transmission of films having a PA-matrix can be lowered; however, the water vapor barrier of casings made of PVDC-copolymers cannot be achieved. Since these ingredients of the mixture—as against aliphatic polyamides—have a high oxygen transmission, the addition of these components to the polyamide increases the oxygen permeability of a casing made of this mixture, as compared to a casing made of pure polyamide.

According to EP 02 16 094 an improved oxygen barrier with a simultaneous high permeability to smoke-flavor substances is achieved by adding to the polyamide ethylene vinyl alcohol copolymers (EVOH). Ethylene vinyl alcohol copolymers have very good barrier properties to oxygen, this barrier being considerably deteriorated by water absorption. Polyamides may also absorb large amounts of water which distinctly increases the permeability rate to oxygen.

DE 38 01 344 describes a biaxially stretched tubular film manufactured from a polymer mixture consisting of aliphatic polyamide, polyterephthalic acid ester and aromatic polyamide, and which additionally contains a dye. The object of this polymer mixture is to achieve a homogeneous distribution of the coloring pigments in the film and to allow an easy biaxial stretching.

All of the mentioned single-layer films based on aliphatic polyamides fail to meet the demand for an effective barrier action against both water vapor and oxygen. In all of the single-layer tubular films based on polyamides, moisture is transferred to the polyamide through direct contact with the hydrous meat mass, resulting in a considerably higher permeability rate to oxygen, as compared to a dry polyamide film. Even the addition of other components cannot lower the high water vapor transmission of polyamides to such an extent that the water vapor barrier of PVDC-copolymers can be achieved. The properties demanded by the users for a tubular film for packaging food stuffs can only be achieved by means of coextruded, biaxially stretched tubular films. In particular, materials must be combined which have high barriers to water vapor and oxygen. In particular with respect to the water vapor barrier these include polyolefins, and with respect to the oxygen barrier blends of aliphatic and partially aromatic polyamides are concerned.

DE 38 16 942 describes a multi-layer plastics film having an outer layer of polyamide resin and an inner layer of polyolefin resin, the layer of polyolefin resin being provided to contact the filling. The tubular film is additionally subjected to an internal corona discharge and must be provided with a blocking inhibitor. These proposals demonstrate that polyolefin layers used as inner sides of packaging films for food stuffs are disadvantageous, since they result in an insufficient adherence between filling and inner wall of the casing and also promote jelly deposition. The adherence must therefore be improved by means of an expensive subsequent treatment following the extrusion. Additionally, the internal corona treatment is not applied to the folded flat edges of the inside polyolefin layer, resulting in jelly deposition at those positions.

Even an ionomer resin layer positioned on the inside of a multi-layer polyamide film must be treated with ionizing radiation, as is shown in EP 01 27 296.

DE 41 28 081 describes a multi-layer, biaxially stretched tubular film consisting of at least three layers, including as outer layer at least one layer of olefinic (co-)polymers, as core layer at least one oxygen-blocking layer of EVOH, aromatic or aliphatic (co-)polyamide, and as inner layer at least one water vapor-blocking layer of aliphatic (co-)polyamide. This casing meets the demand for a good water vapor barrier and has also good adhesion to the filled meat, However, during storage moisture is transferred to the core layer acting as oxygen-blocking layer. Since the moisture collects in the core layer and cannot be evolved through the outer polyolefin layer, which acts as water vapor-blocking layer, the barrier to oxygen gets increasingly worse during storage. For this reason, this casing is not suitable for longer storage periods, in particular for storage without cooling. In addition, another disadvantage of an outer polyolefin layer is the fact that the film must be subjected to a corona discharge prior to printing in order to achieve sufficient adhesion of the printing inks.

DE 41 30 486 describes a five-layer, coextruded, biaxially stretched tubular film built up of at least three polyamide layers forming the core, inner and outer layer. Layers of EVOH or of a primer are positioned between these layers. In the proposed film construction, one or two primer layers consisting of copolymers of ethylene or propylene having functional groups are to act as water vapor barrier. Owing to the functional groups such copolymers have a higher water vapor transmission than polyethylene or polypropylene and, as compared to a layer of polyethylene or polypropylene, do therefore not achieve the same blocking effect to water vapor at the same layer thickness.

EP 04 67 039 A2 claims a multi-layer tubular packaging casing based on polyamide, which is characterized in that it is built up of an outer layer based on aliphatic polyamide, aliphatic copolyamide or a polymer mixture consisting of at least one of said compounds, a central layer of polyolefin and a bonding component, and an inner layer based on aliphatic and/or partially aromatic polyamides and/or aliphatic and/or partially aromatic copolyamides. It is mentioned only in the specification that the central layer may either be a homogeneous mixture of polyolefin and a primer or that the primer is applied to both sides of the polyolefin layer so that the central layer consists of a layer of a polyolefin core and two primer layers applied to both sides of this polyolefin core. Embodiment examples and claims merely relate to a multi-layer film which may be built up of an outer layer of an aliphatic polyamide, one single central layer, and an inner layer consisting either of the same aliphatic polyamide as the outer layer or of a mixture of aliphatic and partially aromatic polyamide or, according to claim 1, completely of partially aromatic polyamide or copolyamide. The outer layer is the actual supporting layer of the multi-layer casing and has the greatest thickness as compared to the two other layers. To improve the oxygen barrier of the casing, the inner layer is made of a mixture consisting of aliphatic polyamide and partially aromatic polyamide. Since the inner layer is to be formed as a very thin layer, however, particularly good oxygen-blocking properties may not be expected. The middle layer which is to serve as a water vapor barrier consists of a mixture of polyolefin and a bonding component. The bonding component is a polyolefin modified with functional groups. Since these modified polyolefins have a higher water vapor transmission than polyethylene or polypropylene, this addition results in a deterioration of the actually good water vapor blocking-properties of the polyolefins. Additionally, as compared to a layer exclusively made of a primer, the central layer has a poorer adhesion to the polyamide layers, this may result in delamination.

It has turned out that such casings still do not yet meet all of the requirements. For instance, sausages packaged in such casings still undergo an excessive weight loss, in particular when not cold-stored, a color change of the filling surface, and wrinkles occur on the product after longer storage periods.

Accordingly, it is the object of the present invention to improve the known casings with respect to avoiding a weight loss during storage without cooling, the occurrence of wrinkles on the packaged products during storage at room temperature instead of storage in the cold store, as well as with respect to avoiding a color change of the filling surface.

According to the present invention this object is achieved by a five-layer, coextruded, optionally biaxially stretched and heat-set tubular packaging film for food stuffs which are in a pasty or molten state during the filling stage and which are optionally subjected to heat processing up to the sterilization temperature, which film is built up of a thin inner and a thick outer layer consisting of the same polyamide, copolyamide and/or polyamide blend, a core polyolefin layer, and two primer layers consisting of the same material and positioned at both sides of the core polyolefin layer.

The inner layer of the five-layer, preferably biaxially stretched and thermoset tubular film contacts the filling and adheres to the meat, thus preventing deposition of jelly between the casing and the filling, Since this layer doesn't need to have blocking properties to water vapor or to oxygen and doesn't need to fulfil a demand for mechanical strength, the wall thickness may be chosen as thin as possible. In general the wall thickness amounts to 1 to 8 μm.

The outer layer is responsible for a wrinkle-free position of the casing around the package content. The mechanical strength of the outer polyamide layer prevents the casing from deforming during filling and during the subsequent heat processing. Also, the casing withstands the pressure during cooking and sterilizing without bursting or rupturing, The outer layer is also responsible for the high oxygen barrier of the casing. Since the outer layer is screened from the filling by the core polyolefin layer which is nearly impermeable to water vapor, the outer layer cannot absorb any moisture from the filling, which would result in a reduction of the oxygen barrier. Owing to the sufficiently high surface tension of the outer polyamide layer, the tubular film can be printed easily and has a good adhesion of the printing inks even during the cooking and sterilization procedures. The wall thickness of this layer usually amounts to 10 to 40 μm.

The inner and outer layers of the tubular film, which are built up of the same material, consist of at least one aliphatic polyamide and/or at least one aliphatic copolyamide and/or at least one partially aromatic polyamide and/or at least one partially aromatic copolyamide. Particularly good results with respect to the oxygen barrier are obtained with mixtures consisting of aliphatic polyamide and partially aromatic polyamide and/or partially aromatic copolyamide. The portion of the partially aromatic polyamide and/or copolyamide amounts to 5 to 60%, in particular 10 to 50%, relative to the polymer mixture of partially aromatic and aliphatic polyamides and copolyamides.

Suitable aliphatic polyamides and aliphatic copolyamides are those polyamides which are generally described in "Kunststoffhandbuch", part VI, "Polyamide", page 7 ff, Carl Hanser Verlag, Munich, 1966. The aliphatic polyamide is a homopolycondensate of aliphatic primary diamines and aliphatic dicarboxylic acids, or a homopolymer of ω-aminocarboxylic acids or their lactams. The aliphatic copolyamide comprises the same units and, for instance, is a polymer based on one or more aliphatic diamines and one or more aliphatic dicarboxylic acids and/or one or different ω-aminocarboxylic acids or their lactams. The aliphatic primary diamines in particular comprise 4 to 8 C-atoms. Suitable diamines include tetra, penta, hexa, and octamethylene diamine, particularly preferred is hexamethylene diamine. The aliphatic dicarboxylic acids in particular comprise 4 to 12 C-atoms. Examples of suitable dicarboxylic acids include adipic acid, azelaic acid, sebacic acid, and dodecane-dicarboxylic acid. The ω-amino-carboxylic acids or their lactams comprise 6 to 12 C-atoms. One example of ω-aminocarboxylic acids is the 11-amino-undecanoic acid. Examples of lactams include ε-caprolactam and ω-laurolactam. Particularly preferred aliphatic polyamides are polycaprolactam (PA 6) and polyhexamethylene adipamide (PA 66). A particularly preferred aliphatic copolyamide is PA 6/66 consisting of units of caprolactam, hexamethylene diamine, and adipic acid.

Polyamides having cyclic aromatic components are described in "Kunststoffhandbuch", part VI, "Polyamide", page 142 ff., Carl Hanser Verlag, Munich, 1966. However, for extrusion purposes, partially aromatic polyamides or copolyamides are the only suitable polyamides because of the melting points in case of partially aromatic polyamides or copolyamides the diamine units may mainly or exclusively form the aromatic units, whereas the dicarboxylic acid units are mainly or exclusively of an aliphatic nature, or the diamine units are mainly or exclusively of an aliphatic nature, whereas the dicarboxylic units mainly or exclusively form the aromatic units.

Examples of the first embodiment include partially aromatic polyamides and copolyamides wherein the aromatic diamine units consist of xylylene diamine and phenylenediamine. The aliphatic dicarboxylic acid units of this embodiment normally comprise 4 to 10 C-atoms, e.g., adipic acid, sebacic acid, and azelaic acid. In addition to the aromatic diamine units and the aliphatic dicarboxylic acid units, aliphatic diamine units and aromatic dicarboxylic acid units may also be comprised in amounts of up to 5 mole-% each. A particularly preferred embodiment consists of m-xylylene diamine units and adipic acid units. This polyamide (PA MXD6) is distributed by Mitsubishi Gas Chemical Company Inc. under the trade name MX-Nylon.

Examples of the second embodiment include partially aromatic polyamides and copolyamides, the aliphatic diamines of which usually have 4 to 8 C-atoms. Amongst the aromatic dicarboxylic acids, isophthalic acid and terephthalic acid are particularly interesting. In addition to the aliphatic diamine units and the aromatic dicarboxylic acid units, aromatic diamine units and aliphatic dicarboxylic acid units may be comprised in amounts of up to 5 mole-% each. A particularly preferred embodiment is composed of units of hexamethylene diamine, isophthalic acid and terephthalic acid. This polyamide (PA 6I/6T) is distributed, for example, by EMS-Chemie AG under the tradename Grivory G 21.

The core layer of polyolefin has the function to act as a barrier layer to water vapor in order to avoid an excessive weight loss during storage without cooling, the occurrence of wrinkles on the product, and a color change on the filling surface owing to drying up. Suitable polyolefins include homopolymers of ethylene or propylene or copolymers of linear α-olefins having 2 to 8 C-atoms, or mixtures of these homopolymers or copolymers with one another. Particularly suitable are polyolefins having melting points of above 120° C., e.g., LLDPE, HDPE, polypropylene homopolymers, as well as polypropylene blockcopolymers and polypropylene random-copolymers. The wall thickness of the core layer in general amounts to 10 to 30 μm.

Since there are only low or even no adhesion forces between coo extruded polyolefin and polyamide layers, a primer layer must be inserted between these layers in order to prevent delamination during the intended use. For this reason, two of the five layers of the tubular film according to the present invention consist of primers; they are provided between the inner polyamide layer and the core polyolefin layer and between the outer polyamide layer and the core polyolefin layer. The wall thickness of each of these primer layers usually amounts to 4 to 8 μm.

The primer layers preferably consist of modified polyolefins. These are modified homo- or copolymers of ethylene and/or propylene, and optionally of further linear α-olefins with 3 to 8 C-atoms having grafted thereon monomers of the group consisting of α,β-unsaturated dicarboxylic acids, such as maleic acid, fumaric acid, itaconic acid or their acid anhydrides, acid esters, acid amides or acid imides. Additionally suitable are copolymers of ethylene or propylene and optionally of further linear α-olefins with 3 to 8 C-atoms having α,β-unsaturated carboxylic acids, such as acrylic acid, methacrylic acid and/or their metallic salts and/or their alkyl esters, or adequate graft polymers of the mentioned monomers on polyolefins or partially saponified ethylene/vinyl acetate-copolymers, which are optionally graft-polymerized with a monomer of the above mentioned acids and have a low saponification degree, or their mixtures. Adequate commercially available products are known, for example, under the tradenames Admer (Mitsui Petrochemical Industries, Ltd.), Plexar (DSM Polymers International), Novatec (Mitsubishi Kasei Corporation), Bynel (Du Pont Company), Surlyn (Du Pont Company), or Primacor (Dow Chemical).

The casing according to the present invention is produced by coextrusion and subsequent biaxial stretching and thermosetting. It is also possible to impart a helical form to the straight tubular film according to known methods first after it has been biaxially stretched, and to carry out the heat-setting afterwards. In general the biaxial stretching is carried out such that a primary tubing is extruded from an annular slot die and cooled rapidly in order to maintain the partially crystalline polymers in the amorphous condition as far as possible. The primary tube is reheated by means of infrared radiation and/or hot air and simultaneous biaxial stretching thereof is then carried out between two gas-tight pairs of rolls, which run at different circumferential speeds, in the longitudinal direction and by means of an entrapped air bubble in the transversal direction. Heat-setting follows the biaxial stretching, with the tubing being subjected to a heat treatment using an entrapped air bubble again. A corresponding method for the manufacture of biaxially stretched tubular films is described, for example, in U.S. Pat. No. 3,788,503.

The biaxial stretching is carried out at temperatures of about 70°–120° C. The stretching ratios in both the longitudinal and transversal direction are in the range of about 1:1.5 to 1:4. The stretching ratio in relation to the surface is in the range of 6 to 14. The polymer chains are orientated by the biaxial stretching. For this reason, the casing has an excellent deformation stability, a high strength and an elastic relaxation capacity.

Thermosetting is carried out at temperatures from 100° to 180° C. The casing achieves its dimensional stability through said heat-setting. Depending on the temperatures during thermosetting, a shrinkable or non-shrinkable casing may be manufactured. The shinkage of the film may be adjusted in the range between 0 to 20%, measured in water at 80° C. Additionally, the tubular film may be subjected to a controlled shrinkage in the longitudinal and transversal direction during heat-setting.

In the coextrusion of tubular films and tubes coextrusion dies having an outlet cross section in the form of an annular die gap are used, they are described, for instance, in the book "Kunststoff Extrusionstechnik I", page 450 ff, Carl Hanser Verlag, Munich Vienna, 1989. The individual melt streams, which are created by the individual extruders by means of melting thermoplastic polymers, are led separately within the coextrusion die first, are then combined at a combination place within the coextrusion die, and are subsequently guided to the die outlet together. In the coextrusion of a five-layer tubing, five melt streams, which must normally be produced by five single extruders, must be led to the coextrusion die.

In case of the five-layer casing according to the present invention it is possible to use three extruders, thus saving investment costs which in turn results in a reduction of production costs. The inner and outer polyamide layer of the five-layer tubular film may consist of the same polyamide or polyamide blend. Also, the two primer layers may consist of the same material. For this reason, melting of the polyamide or polyamide blend and of the primer can be effected in one extruder for each. The melt stream provided by the extruder is then divided into two melt streams outside the coextrusion die in accordance with the wall thickness of the individual layers, and these streams are then led to the extrusion die. It is of particular advantage to use gear pumps in dividing the melt streams, since the amount of the individual streams can be controlled very exactly.

The tubular film may be further processed according to known finishing methods. The tubular film can be printed and shirred easily or made up into casings tied-off or clipped at one end without any difficulty. Also, filling with sausage meat and subsequent heat processing up to sterilization temperature can be carried out easily. In particular, the casing does not bulge and lies on the sausage in a taught and wrinkle-free manner after cooling. Sausages manufactured with this casing can be cut in a clean manner without tear. The casing can easily be peeled in a helical manner. There will be no delamination of the layers. Owing to the excellent water vapor barrier of the casing according to the present invention boiled and liver sausages can be stored—even without cooling—without undergoing a noticeable weight loss. As compared to single-layer or multilayer casings according to the art, discoloration of the sausage surface when liver sausage meat is used takes place at a considerably later date due to the good oxygen and water vapor barrier.

DETAILED DESCRIPTION OF THE PREFERRED EMBODIMENTS

The present invention will be illustrated in more detail by means of the following examples.

EXAMPLE 1

The polymers or polyblends A, B, and C are plasticized and homogenized separately in three extruders. Subsequently the melt streams of polymers A and B are split, and the five resulting melt streams are fed to a five-layer extrusion head. A primary tubing having the composition A/B/C/B/A is extruded. The individual layers consist of the following materials:

| | |
|---|---|
| Outer layer: | Dryblend of 90% polyamide 6 (Durethan B 40 F of Bayer AG) and 10% polyamide MXD6 (MX-Nylon of Mitsubishi Gas Chemical Company Inc.). The mean wall thickness amounts to 164 µm. |
| Primer: | Modified polyethylene (Admer L 2100 of Mitsui Petrochemical Industries, Ltd.). The mean wall thickness amounts to 38 µm. |
| Central layer: | Polyethylene (LLDPE, Dowlex 2045 E of Dow Chemical Co.). The mean wall thickness amounts to 122 µm. |
| Primer: | Modified polyethylene (Admer L 2100 of Mitsui Petrochemical Industries, Ltd.). The mean wall thickness amounts to 38 µm. |
| Inner layer: | Dryblend of 90% polyamide 6 (Durethan B 40 F of Bayer AG) and 10% polyamide MXD6 (MX-Nylon of Mitsubishi Gas Chemical Company Inc.). The mean wall thickness amounts to 38 µm. |

The primary tubing has a diameter of 14 mm and a mean total wall thickness of 0.4 mm.

The primary tube is heated to 105° C. by means of infrared radiation and stretched biaxially at a surface stretching ratio of 9.3. The biaxially stretched tubing is heat-set, collapsed and wound. The mean total wall thickness of the tubing amounts to 55 µm, the flat width amounts to 62 mm. The mean wall thicknesses of the individual layers amount to:

| | |
|---|---|
| Outer layer: | 23 µm |
| Primer: | 5 µm |
| Central layer: | 17 µm |
| Primer: | 5 µm |
| Inner layer: | 5 µm |

EXAMPLE 2

In accordance with Example 1, a five-layer primary tubing having the following structure is produced:

| | |
|---|---|
| Outer layer: | Dryblend of 70% polyamide 6 (Ultramid B 4 of BASF AG), 20% polyamide MXD6 (MX-Nylon of Mitsubishi Gas Chemical Company Inc.), and 10% polyamide 6I/6T (Grivory G 21 of EMS Chemie AG). |
| Primer: | Modified polypropylene (Novatec AP 196 P of Mitsubishi Kasei Co.) |
| Central layer: | Polypropylene copolymer (Novolen 3200 HX of BASF AG). |
| Primer: | Modified polypropylene (Novatec AP 196 P of |

| | |
|---|---|
| Inner layer: | Mitsubishi Kasei Co.) Dryblend of 70% polyamide 6 (Ultramid B 4 of BASF AG), 20% polyamide MXD6 (MX-Nylon of Mitsubishi Gas Chemical Company Inc.), and 10% polyamide 6I/6T (Grivory G 21 of EMS Chemie AG). |

The primary tube is biaxially stretched and heat-set as in Example 1. The distribution of the wall thicknesses corresponds to Example 1.

EXAMPLE 3

In accordance with Example 1, a five-layer primary tube having the following structure is produced:

| | |
|---|---|
| Outer layer: | Dryblend of 50% polyamide 6 (Akulon F 138 C of DSM Polymers International) and 50% polyamide MXD6 (MX-Nylon of Mitsubishi Gas Chemical Company Inc.) |
| Primer: | Modified polyethylene (Bynel 4105 of Du Pont Company). |
| Central layer: | LLDPE (Stamylex 3026 F of DSM Polymers International). |
| Primer: | Modified polyethylene (Bynel 4105 of Du Pont Company). |
| Inner layer: | Dryblend of 50% polyamide 6 (Akulon F 138 C of DSM Polymers International) and 50% polyamide MXD6 (MX-Nylon of Mitsubishi Gas Chemical Company Inc.) |

The primary tubing is biaxially stretched and heat-set as in Example 1. The distribution of the wall thicknesses corresponds to Example 1.

For comparison purposes the following tubings were tested:

| | |
|---|---|
| Comparative Example 1: | Tubular film of PVDC-copolymer |
| Comparative Example 2: | Single-layer tubular film according to DE 28 50 181 |
| Comparative Example 3: | Three-layer tubular film according to EP 04 67 039 |
| Comparative Example 4: | Five-layer tubular film according to DE 41 30 486 |

The barrier properties and the application technological assessments of the casings are listed in Table 1.

TABLE 1

| | Barrier properties and application technological assessment | | | | |
|---|---|---|---|---|---|
| | Water vapor transmission[1] (g/m$^2$d) | Oxygen transmission[2] (cm$^3$/m$^2$ dbar) | Weight loss[3] (%) | Formation of wrinkles[3] | Discoloration of filling surface 4) |
| Example 1 | 2.9 | 14 | 0.7 | no | 1–2 |
| Example 2 | 2.8 | 11 | 0.7 | no | 1 |
| Example 3 | 2.7 | 8 | 0.6 | no | 0–1 |
| Comp. Ex. 1 | 2.7 | 10 | 0.5 | no | 0–1 |
| Comp. Ex. 2 | 13.0 | 13 | 6.0 | after 11 days | 3 |
| Comp. Ex. 3 | 7.5 | 14 | 3.2 | after 22 days | 2 |
| Comp. Ex. 4 | 11.0 | 12 | 4.8 | after 17 days | 2 |

[1] Determined with PERMATRAN-W 200 of Modern Controls Inc. at 23° C. and 85% relative humidity
[2] Determined with OX-TRAN 200-H of Modern Controls Inc. at 23° C. and 50% relative humidity
[3] Storage test with pork sausage meat at 23° C. and 50% relative humidity over a period of 28 days
4) Storage test with liver sausage meat under light exposure at 23° C. and 50% relative humidity over a period of 28 days
Assessment:
0 = no discoloration
1 = very slight discoloration (scarcely noticeable)
2 = slight discoloration
3 = moderate discoloration
4 = severe discoloration
5 = very severe discoloration

I claim:

1. A five-layer tubular film for packaging pasty foodstuffs, said film comprising an inner polyamide layer and an outer polyamide layer, a core polyolefin layer, and two primer layers; said polyamide layers being formed of the same polyamide material consisting of at least one polyamide selected from the group consisting of aliphatic polyamides, aliphatic copolyamides, partially aromatic polyamides and partially aromatic copolyamides; and said two primer layers consisting of the same material as each other.

2. A film according to claim 1, wherein said film is a sausage casing.

3. A film according to claim 1, wherein said polyamide material is a polymer mixture of partially aromatic and aliphatic polyamides and copolyamides comprising from 5 to 60% of partially aromatic polyamide, partially aromatic copolyamide or a mixture thereof, relative to the total weight of the polyamide material.

4. A film according to claim 3, wherein the polyamide material comprises from 10 to 60% of partially aromatic polyamide, partially aromatic copolyamide or a mixture thereof, relative to the total weight of the polyamide material.

5. A tubular film according to claim 1, wherein the inner and outer polyamide layers comprise at least one aliphatic polyamide or copolyamide formed from at least one aliphatic primary diamine and at least one aliphatic dicarboxylic acid, or from at least one omega-amino-carboxylic acid.

6. A tubular film according to claim 5, wherein the inner and outer polyamide layers comprise at least one aliphatic polyamide or copolyamide formed from at least one aliphatic primary diamine having 4 to 8 carbon atoms and at least one aliphatic dicarboxylic acid having 4 to 12 carbon atoms, or from an 11-amino undecanoic acid or a lactam thereof.

7. A tubular film according to claim 6, wherein the inner and outer polyamide layers comprise at least one aliphatic polyamide or copolyamide formed from hexamethylene diamine and adipic acid, azelaic acid, sebacic acid or dodecane-dicarboxylic acid, or from epsilon-caprolactam or omega-laurolactam.

8. A tubular film according to claim 1, wherein the inner and outer polyamide layers comprise a partially aromatic polyamide or copolyamide formed from aromatic diamine units and aliphatic dicarboxylic acid units having 4 to 10 carbon atoms, or from aliphatic diamines having 4 to 8 carbon atoms and aromatic dicarboxylic acids.

9. A tubular film according to claim 8, wherein the inner and outer polyamide layers comprise a partially aromatic polyamide or copolyamide formed from xylylene diamine or phenylenediamine and adipic acid, sebacic acid or azelaic acid or from tetramethylene diamine, pentamethylene diamine, hexamethylene diamine or octamethylene diamine and isophthalic acid or terephthalic acid.

10. A tubular film according to claim 8, wherein the partially aromatic polyamide or copolyamide predominantly comprises aromatic diamine units and aliphatic dicarboxylic acid units and further comprises up to 5 mole-% each aliphatic diamine units and aromatic dicarboxylic acid units, or the partially aromatic polyamide or copolyamide predominantly comprises aliphatic diamine units and aromatic dicarboxylic acid units and further comprises up to 5 mole-% each of aromatic diamine units and aliphatic dicarboxylic acid units.

11. A tubular films according to claim 8, wherein the partially aromatic polyamide is formed from m-xylylene diamine units and adipic acid units or from hexamethylene diamine units and isophthalic acid or terephthalic acid units.

12. A tubular film according to claim 1, wherein said core polyolefin layer is formed of at least one olefin polymer material selected from the group consisting of homopolymers of ethylene or propylene and copolymers of linear alpha-olefins having 2 to 8 carbon atoms.

13. A tubular film according to claim 12, wherein said olefin polymer material has a melting point of greater than 120° C. and is selected from the group consisting of linear low-density polyethylene, high-density polyethylene, polypropylene homopolymers, polypropylene block copolymers and polypropylene random-copolymers.

14. A tubular film according to claim 1, wherein said two primer layers consist of modified polyolefins modified with functional groups.

15. A tubular film according to claim 14, wherein said modified polyolefins are modified homopolymers or copolymers of ethylene or propylene having grafted thereon at least one monomer selected from the group consisting of alpha-beta-unsaturated dicarboxylic acids and acid anhydrides, esters, amides and imides thereof.

16. A tubular film according to claim 15, wherein said modified homopolymer or copolymer further comprises at least one linear alpha-olefin having 3 to 8 carbon atoms.

17. A tubular film according to claim 15, wherein said at least one monomer is selected from the group consisting of maleic acid, fumaric acid, itaconic acid and acid anhydrides, esters amides and imides thereof.

18. A tubular film according to claim 14, wherein the modified polyolefins of the two primer layers are selected from the group consisting of copolymers of ethylene or propylene with an alpha-beta-unsaturated carboxylic acid or a metallic salt or alkyl ester thereof, graft copolymers of an alpha-beta-unsaturated carboxylic acid or a metallic salt or alkyl ester thereof on a polyolefin, partially saponified ethylene/vinyl acetate copolymers, partially saponified ethylene/vinyl acetate copolymers which are graft-polymerized with an alpha-beta-unsaturated carboxylic acid, and mixtures thereof.

19. A tubular film according to claim 18, wherein said alpha-beta-unsaturated carboxylic acid is acrylic acid or methacrylic acid.

20. A tubular film according to claim 1, wherein said film is a coextruded and biaxially stretched tubular film.

21. A tubular film according to claim 1, wherein said film is heat-set.

22. A tubular film according to claim 1, wherein said film has a wall thickness of 30 to 90 µm.

23. A tubular film according to claim 22, wherein said film has a wall thickness of 40 to 80 µm.

* * * * *